United States Patent [19]

Kadoya

[11] Patent Number: 5,043,000
[45] Date of Patent: Aug. 27, 1991

[54] AIR CLEANER ELEMENT AND METHOD OF MANUFACTURING THE SAME

[75] Inventor: Teruichi Kadoya, Hamakita, Japan

[73] Assignee: Toyo Roki Seizo K.K., Shizuoka, Japan

[21] Appl. No.: 462,296

[22] Filed: Dec. 29, 1989

Related U.S. Application Data

[63] Continuation of Ser. No. 244,361, Sep. 15, 1988, abandoned.

[30] Foreign Application Priority Data

| Sep. 18, 1987 | [JP] | Japan | 62-141652[U] |
| Sep. 18, 1987 | [JP] | Japan | 62-141653[U] |
| Sep. 18, 1987 | [JP] | Japan | 62-141654[U] |
| Sep. 18, 1987 | [JP] | Japan | 62-232529 |

[51] Int. Cl.$^5$ .................. B01D 27/06; B01D 29/07
[52] U.S. Cl. ................... 55/484; 55/498; 55/499; 55/521; 210/493.5; 210/497.2
[58] Field of Search .............. 55/484, 497–499, 55/502, 503, 521, DIG. 5; 210/488, 493.1, 493.5, 497.1, 497.2

[56] References Cited

U.S. PATENT DOCUMENTS

| 2,843,218 | 7/1958 | Kiekhaefer | 55/497 X |
| 3,076,555 | 2/1963 | Jackson et al. | 55/497 X |
| 3,279,616 | 10/1966 | Bourdale | 55/502 X |
| 3,640,396 | 2/1972 | Brownell | 55/498 X |
| 3,859,068 | 1/1975 | McLaren et al. | 55/498 |
| 3,906,724 | 9/1975 | Yoshizaki | 55/484 X |
| 3,937,663 | 2/1976 | Bessiere | 55/498 X |
| 4,154,688 | 5/1979 | Pall | 55/498 X |
| 4,430,223 | 2/1984 | Miyakawa et al. | 55/498 X |
| 4,439,321 | 3/1984 | Taki et al. | 55/484 X |
| 4,486,206 | 12/1984 | Miyakawa et al. | 55/498 X |
| 4,498,989 | 2/1985 | Miyakawa et al. | 55/484 X |
| 4,640,698 | 2/1987 | Ohishi et al. | 55/503 X |
| 4,640,779 | 2/1987 | Taki et al. | 55/521 X |
| 4,655,921 | 4/1987 | Fujimoto | 55/521 X |
| 4,673,503 | 6/1987 | Fujimoto | 55/498 X |
| 4,710,297 | 12/1987 | Suzuki et al. | 55/498 X |
| 4,738,778 | 4/1988 | Taki et al. | 55/521 X |
| 4,744,902 | 5/1988 | Taki et al. | 55/521 X |
| 4,826,518 | 5/1989 | Furrer et al. | 55/521 X |

FOREIGN PATENT DOCUMENTS

| 0093954 | 6/1983 | Japan | 55/498 |
| 0031535 | 7/1985 | Japan | 55/498 |
| 62-071511 | 4/1987 | Japan | 55/498 |
| 62-079826 | 4/1987 | Japan | 55/498 |
| 62-079827 | 4/1987 | Japan | 55/498 |
| 62-110722 | 5/1987 | Japan | 55/498 |
| 62-216618 | 9/1987 | Japan | 55/498 |
| 1242206 | 7/1986 | U.S.S.R. | 55/521 |
| 2125707 | 3/1984 | United Kingdom | 55/497 |

Primary Examiner—Robert Spitzer
Attorney, Agent, or Firm—Sughrue, Mion, Zinn Macpeak & Seas

[57] ABSTRACT

An air filter element incudes a plurality of filter paper units each composed of a sheet of filter paper corrugated into a number of folds extending from one side to the other of the sheet, the filter paper units being arranged such that ridges of the folds extend on or parallel to radial lines extending radially outwardly from a center of the air cleaner element, and at least one connector interconnecting side edges of the filter paper units. With the air cleaner element incorporated in an air cleaner, air drawn into the air cleaner from an air inlet flows into a space above the air cleaner element, and then flows through the air cleaner element at a uniform speed over the entire area of the air cleaner element. Therefore, the air can uniformly be filtered, and the resistance to the air flow of the air cleaner element is reduced. The area of the air cleaner element which is open to the air flow is several times greater than the cross-sectional area of the air inlet. Since the speed of the air flow greatly drops upon entering the air inlet side of the air cleaner element from the air inlet, a chamber effect is produced.

5 Claims, 10 Drawing Sheets

AIR CLEANER ELEMENT AND METHOD OF MANUFACTURING THE SAME

This is a continuation of application Ser. No. 07/244,361 filed Sept. 15, 1988, now abandoned.

BACKGROUND OF THE INVENTION

The present invention relates to an air cleaner element and a method of manufacturing the same, and more particularly to an air cleaner element for use in an air cleaner for an internal combustion engine, and a method of manufacturing such an air cleaner element.

It is generally known that air cleaner elements for use in air cleaners for internal combustion engines are available in dry and wet types. In both dry and wet types, the air cleaner elements mainly rely on surface filtration and depth-type filtration. It is important that such air cleaner elements have a filtration ability to effectively separate minute particles such as dust particles from a fluid to be filtered and keep a good filtration ability for a long period of time.

Various air filter elements have been proposed to meet the above requirements. Air filter elements of the surface filtration type include an air filter element having filter paper with its surface napped, an air cleaner element with its surface roughened by a special process to increase the actual surface area, and an air cleaner element coated with a special sticky material or oil for facilitating the formation of a dust cake layer and also for a longer service life. Air filter elements based on the depth-type filtration include an air filter element composed of filter paper layers of different fiber densities to provide a density gradient in the transverse direction of the filter paper.

Air cleaners for internal combustion engines employ air filter elements described above. One conventional air cleaner for use with an internal combustion engine is illustrated in FIGS. 23 and 24 of the accompanying drawings. The air cleaner, generally indicated by the reference numeral 21, comprises a cylindrical cleaner element 23 disposed in an air cleaner case 22 and constructed of a filter paper layer bent into a number of folds. Air to be filtered is drawn from an inlet 22*i* into the air cleaner case 22 and flows along the inner peripheral surface of the air cleaner case 22 and across the cylindrical element 23 from its outer peripheral side to its inner peripheral side. At this time, the air is filtered by the cleaner element 23, and only cleaned air from which dust is separated is discharged from an outlet 22*o*.

The conventional air cleaner element is disadvantageous in that since there is an area limitation between the air cleaner case and the cleaner element, the length of the air flow path is irregular (e.g., the air flow path up to a point b is longer than the air flow path up to a point a), and the speed of the air flow is not uniform on various portions of the cleaner element. For this reason, the resistance of the filter paper of the cleaner element to the air flow is not uniform, and the air flows through the filter paper at different speeds at various areas of the filter paper, so that uniform filtration cannot be achieved.

The process of manufacturing the conventional air cleaner element has limitations such that very thin cleaner elements having a thickness of from 10 to 15 mm, for example, cannot be produced easily. Even if such a thin cleaner element could be manufactured, the cross-sectional area of the air flow path would be greatly reduced, and the resistance to the air flow would be increased. When an air cleaner element is designed to maintain a desired cross-sectional area of air flow path with a view to lowering the resistance to the air flow, the air cleaner element becomes relatively thick, and hence a substantially thin air cleaner element cannot be obtained.

SUMMARY OF THE INVENTION

In view of the aforesaid drawbacks of the conventional air cleaner elements, it is an object of the present invention to provide an air cleaner element which has an increased filtration capability, and is small in size and light in weight.

Another object of the present invention is to provide a method of manufacturing an air cleaner element, the method comprising simple manufacturing steps.

According to one aspect of the present invention, there is provided an air cleaner element comprising a plurality of filter paper units each composed of a sheet of filter paper corrugated into a number of folds extending from one side to the other of the sheet, the filter paper units being arranged such that ridges of the folds extend on or parallel to radial lines extending radially outwardly from a center of the air cleaner element, and at least one connector interconnecting side edges of the filter paper units.

With the air cleaner element incorporated in an air cleaner, air drawn into the air cleaner from an air inlet flows into a space above the air cleaner element, and then flows through the air cleaner element at a uniform speed over the entire area of the air cleaner element. Therefore, the air can uniformly be filtered, and the resistance to the air flow of the air cleaner element is reduced. The area of the air cleaner element which is open to the air flow is several times greater than the cross-sectional area of the air inlet. Since the speed of the air flow greatly drops upon entering the air inlet side of the air cleaner element from the air inlet, a chamber effect is produced.

According to another aspect of the present invention, there is also provided an air cleaner element comprising a plurality of filter paper units each composed of a sheet of filter paper corrugated into a number of folds extending from one side to the other of the sheet, and a resin member interconnecting side edges of the filter paper units, each of the folds having fold members held closely together at opposite ends of the fold over a prescribed length from a ridge of the fold, the fold members held closely together being encased in a region by the resin member, thereby defining openings between adjacent ones of the regions, which communicate with air passages defined between adjacent ones of the folds.

Since the fold members of each fold are held closely together at opposite ends of the fold over the prescribed length from the ridge of the fold, the resin member which seals or encases the outer edges of the filter paper units is provided with the openings of a large air flow area which communicate with the air passages defined between the folds. Therefore, where the air cleaner element is incorporated in an air cleaner, air to be filtered can be led from the outer edges of the filter paper units through the openings into the air passages between the folds.

According to still another aspect of the present invention, there is also provided an air cleaner element comprising a plurality of filter paper units each composed of a sheet of filter paper corrugated into a number of folds extending from one side to the other of the sheet, and a resin member interconnecting side edges of the filter paper units, the resin member including connectors extending from an inner end to an outer end of the air cleaner element and having groove-like air passages interconnecting the inner and outer ends, the groove-like air passage communicating with air passages defined between adjacent ones of the folds.

Where the air cleaner element is incorporated in an air cleaner, air impinging upon the resin member on the side edges of the filter paper units is led through the groove-like air passages interconnecting the inner and outer ends into the air passages defined between the folds.

There is also provided a method of manufacturing an air cleaner element composed of a plurality of filter paper units each composed of a sheet of filter paper corrugated into a number of folds extending from one side to the other of the sheet, and a resin member interconnecting side edges of the filter paper units, the method comprising the steps of forming straight creases on a filter paper sheet, corrugating the filter paper sheet along the straight creases into a number of folds, blanking the corrugated filter paper sheet into a filter paper unit of a prescribed shape, inserting a plurality of filter paper units into a mold, and pouring a resin material into the mold to integrally mold connectors interconnecting side edges of the filter paper units and inner and outer frame members.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

An air cleaner element according to a first embodiment of the present invention is illustrated in FIGS. 1 through 5.

Figure 1:
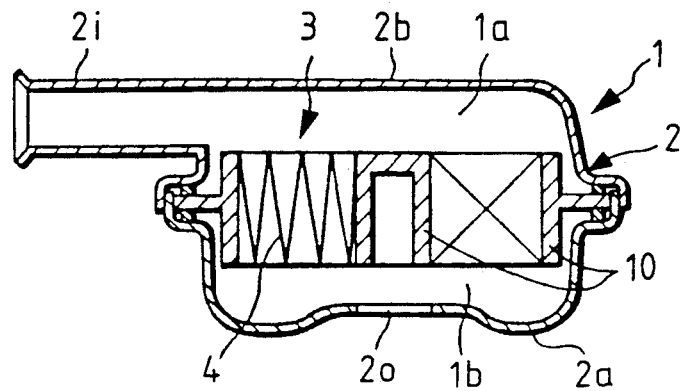
FIG. 1 is a cross-sectional view of an air cleaner with an air cleaner element of the present invention being incorporated therein.

FIG. 1 shows an air cleaner 1 in cross section, the air cleaner 1 comprising an air cleaner case 2 and an air cleaner element 3.

The air cleaner case 2 comprises a lower case member 2a and an upper case member 2b. The upper case member 2b has an air inlet 2i in the form of a pipe, and the lower case member 2a has an air outlet 2o. The air cleaner element 3 is disposed in the air cleaner case 2.

Figure 3:
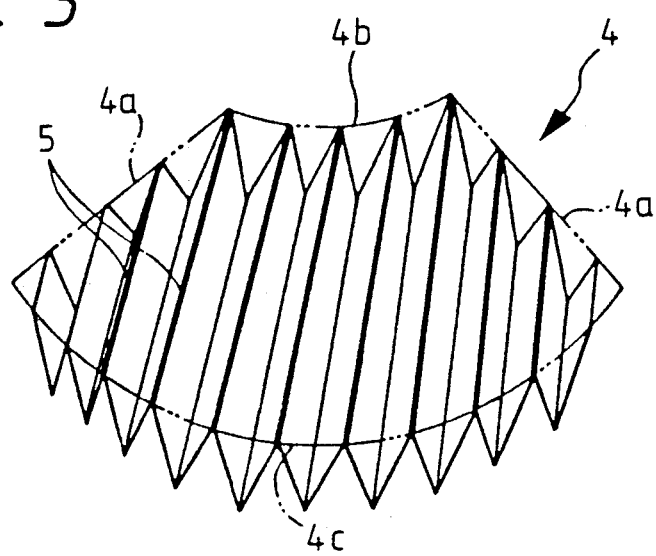
FIG. 3 is a perspective view of a filter paper.
Figure 4:
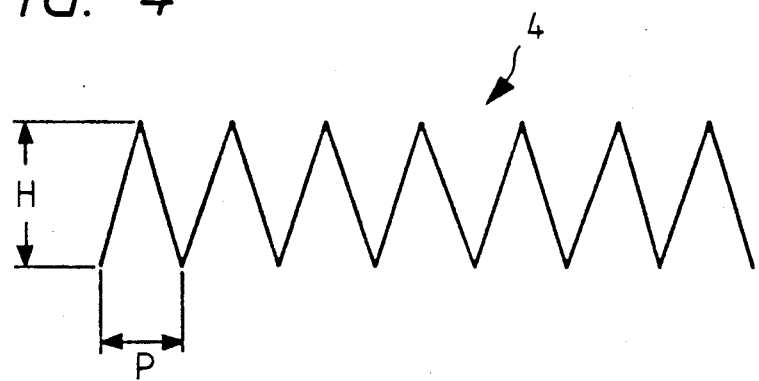
FIG. 4 is a cross-sectional view taken along line IV—IV of FIG. 2.

The air cleaner element 3 comprises a plurality of filter paper units 4 and resin members 10 serving as connectors for interconnecting side edges of the filter paper units 4, the air cleaner element 3 being of a circular shape. As shown in FIG. 3, each of the filter paper units 4 is made of a sheet of filter paper which is corrugated into a number of mountain folds extending from one side to the other, the folded sheet being pressed and blanked into a predetermined shape (such as a sectorial shape as shown) by cutting off an outer peripheral portion thereof. The filter paper of the filter paper units 4 is made of 50% of cotton fiber and 50% of chemical fiber. As shown in FIG. 4, the folds have a depth H and a pitch P. The filter paper units 4 are inserted in a mold, and a resin material such as polyethylene, polypropylene, or the like is poured into the mold to join side edges 4a and inner and outer ends 4b, 4c of the adjacent filter paper units 4 with the resin members 10, thus producing the air cleaner element 3.

For joining the filter paper units 4 with the resin members 10, the filter paper units 4 are arranged such that ridges 5 of the folds of the filter paper units 4 extend on or parallel to radial lines r extending radially outwardly from the center of the circular cleaner element 3 to be formed. More specifically, in the embodiment of FIG. 2, the three filter paper units 4 are arranged such that the fold ridges 5 thereof extend on or parallel to the radial lines $r_1$, $r_2$, $r_3$. When the resin material is molded, it is heated to about 220° C. A vertical injection molding machine is preferably used for allowing the filter paper units 4 to be inserted easily.

Operation of the air cleaner element thus constructed will be described below.

Figure 2:
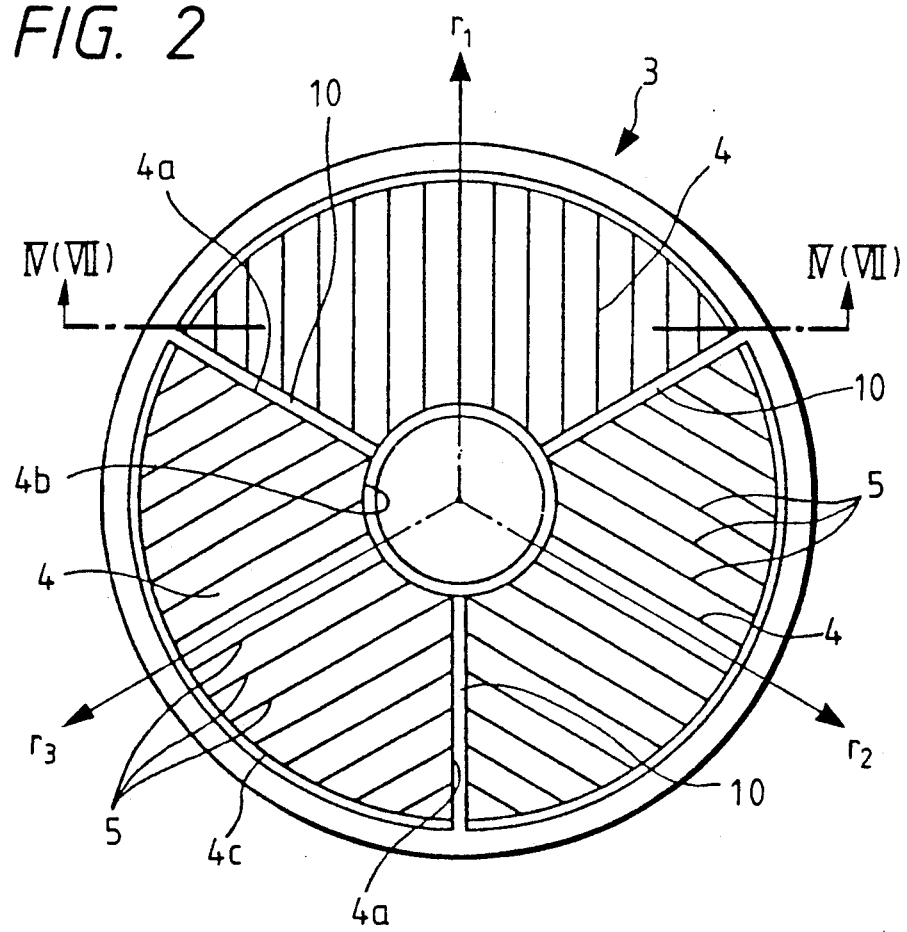
FIG. 2 is a plan view of an air cleaner element according to a first embodiment of the present invention.

As shown in FIGS. 1 and 2, air introduced from the air inlet 2*i* of the air cleaner 1 flows into an upper air cleaner chamber 1*a* above the air cleaner element 3. The cross-sectional area of the upper air cleaner chamber 1*a* is several times larger than the cross-sectional area of the air inlet 2*i*, so that the speed of the air flow upon entering the upper air cleaner chamber 1*a* from the air inlet 2*i* is greatly reduced. Then, the air flows from the upper air cleaner chamber 1*a* across the air cleaner element 3 into a lower air cleaner chamber 1*b* defined therebelow. At this time, the air is filtered by the air cleaner element 3, and only clean air from which dust has been removed is delivered from the air outlet 2*o* into a carburetor (not shown). When the air passes through the air cleaner element 3, it flows at a uniform speed through the entire area of the air cleaner element 3. Since the folds of the air cleaner element 3 are spaced at equal pitches, the resistance to the air flow across the air cleaner element 3 is uniform.

Figure 5:
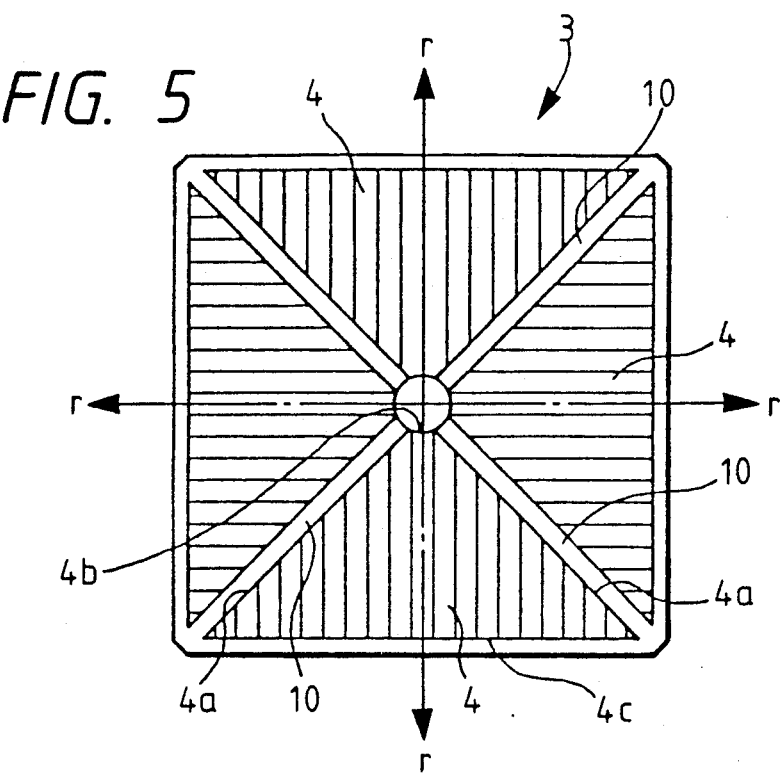
FIG. 5 is a plan view of a modification of the air cleaner element according to the first embodiment.

FIG. 5 shows a modification of the air cleaner element 3.

The modified air cleaner element 3 shown in FIG. 5 has a square outer profile. The air cleaner element 3 has filter paper units 4 each constructed by corrugating a sheet of filter paper into a number of mountain folds and cutting off the filter paper into a substantially triangular shape by pressing. The filter paper units 4 are then arranged such that the ridges 5 of the folds run parallel to radial lines r, as with the structure of FIG. 2, and side edges 4*a* and inner and outer ends 4*b*, 4*c* of the filter paper units 4 are joined by resin members 10, thus producing the air cleaner element 3.

With the above embodiment, as described above, since the area of the air cleaner element which is open to a supplied fluid to be filtered is much larger than the cross-sectional area of the air inlet, the speed of the fluid is greatly lowered, high filtration efficiency is obtained, and the air cleaner element has an increased service life. Inasmuch as the area of the fluid flow path is large, the resistance to the fluid flow up to the air cleaner element is reduced.

Furthermore, the fluid to be filtered drawn from the air cleaner inlet enters the upper side of the air cleaner element, and then passes at uniform speed through the entire area of the air cleaner element while at the same time being filtered thereby. Therefore, the resistance to the fluid flow is reduced, and the fluid is filtered uniformly through the different areas of the filter cleaner element.

As the filtration area of the air cleaner element is made sufficiently large, the air cleaner element may be reduced in thickness, small in size, and light in weight.

Figure 6:
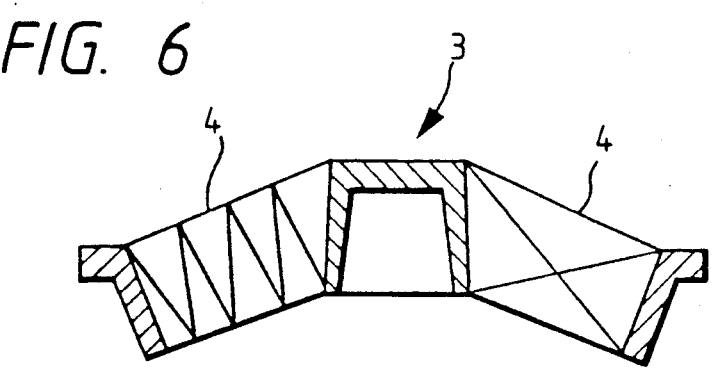
FIG. 6 is a cross-sectional view of an air cleaner element according to a second embodiment of the present invention.
Figure 7:
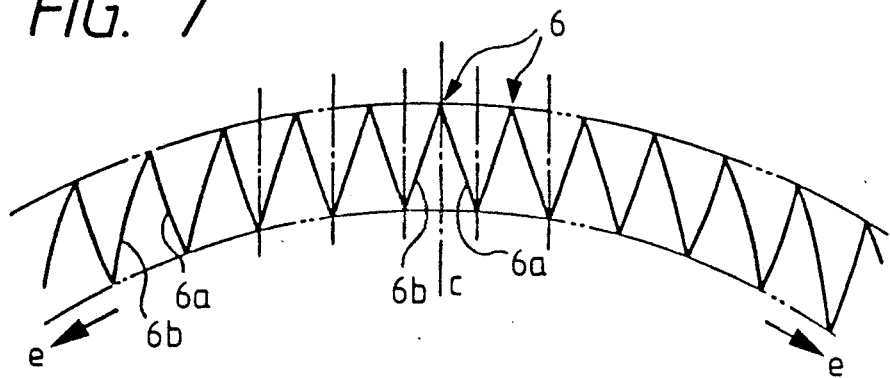
FIG. 7 is an enlarged fragmentary cross-sectional view of the air cleaner element of FIG. 6.

An air cleaner element according to a second embodiment of the present invention will be described with reference to FIGS. 6 and 7. As shown in FIG. 6, the air cleaner element 3 of the second embodiment is of a conical shape, but is viewed in plan in exactly the same manner as in FIG. 2. As shown in FIG. 7, which is a cross-sectional view taken along line VII—VII of FIG. 2, each of filter paper units 4 of the air cleaner element 3 has mountain folds which are progressively curved from the center to the ends thereof. More specifically, a pair of fold members 6*a*, 6*b* of each of mountain folds 6 of the filter paper unit 4 is progressively curved to a greater degree, with a concave side facing toward the center c, in directions from the center c to the ends e. At each of the ends e, the fold members 6*a*, 6*b* have different lengths. By thus forming the filter paper units 4, after the connectors 10 have been molded, the mold can be removed in the same one of the vertical directions. The other structural details are the same as those of the preceding embodiment.

In the second embodiment, the same filtration area can be obtained with smaller outer dimensions than those of the air cleaner element shown in FIG. 2, so that the air cleaner may be smaller and lighter.

An inverted conical air cleaner element which is provided by turning the conical air cleaner element of FIG. 6 upside down can also offer the same advantages as those of the illustrated conical air cleaner element.

An air cleaner element according to a third embodiment of the present invention will be described below with reference to FIGS. 8 through 14.

Figure 9:
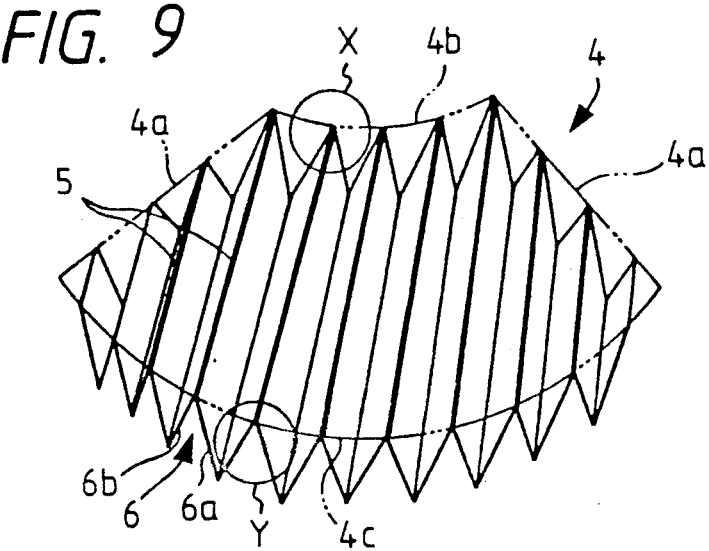
FIG. 9 is a perspective view of a filter paper.
Figure 10:
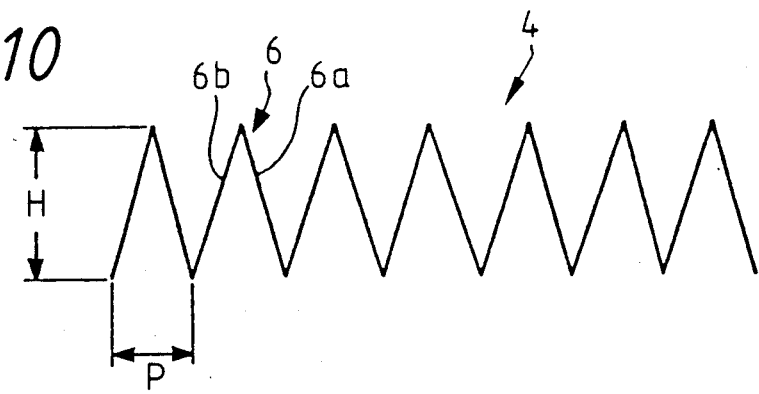
FIG. 10 is a cross-sectional view taken along line X—X of FIG. 8.

The air cleaner element 3 of the third embodiment comprises a plurality of filter paper units 4 and a resin member 10 interconnecting side edges of the filter paper units 4, the air cleaner element 3 being circular in shape. As shown in FIG. 9, each of the filter paper units 4 is made of a sheet of filter paper which is corrugated into a number of mountain folds extending from one side to the other, the folded sheet being pressed and blanked into a predetermined shape (such as a sectorial shape as shown) by cutting off an outer peripheral portion thereof. The filter paper of the filter paper units 4 is made of 50% of cotton fiber and 50% of chemical fiber. As shown in FIG. 10, the folds have a depth H and a pitch P. The filter paper units 4 are inserted in a mold, and a resin material such as polyethylene, polypropylene, or the like is poured into the mold to join side edges 4*a* and inner and outer ends 4*b*, 4*c* of the adjacent filter paper units 4 with the resin member 10, thus producing the air cleaner element 3. The resin member 10 provides connectors 11 joining the filter paper units 4, an inner frame member 12, and an outer frame member 13 of the air cleaner element 3.

For joining the filter paper units 4 with the resin member 10, the filter paper units 4 are arranged such that ridges 5 of the folds of the filter paper units 4 extend on or parallel to radial lines r extending radially outwardly from the center of the circular cleaner element 3 to be formed. More specifically, in the embodiment of FIG. 8, the three filter paper units 4 are arranged such that the fold ridges 5 thereof extend on or parallell to the radial lines $r_1$, $r_2$, $r_3$. When the resin material is molded, it is heated to about 220° C. A vertical injection molding machine is preferably used for allowing the filter paper units 4 to be inserted easily.

Figure 11:
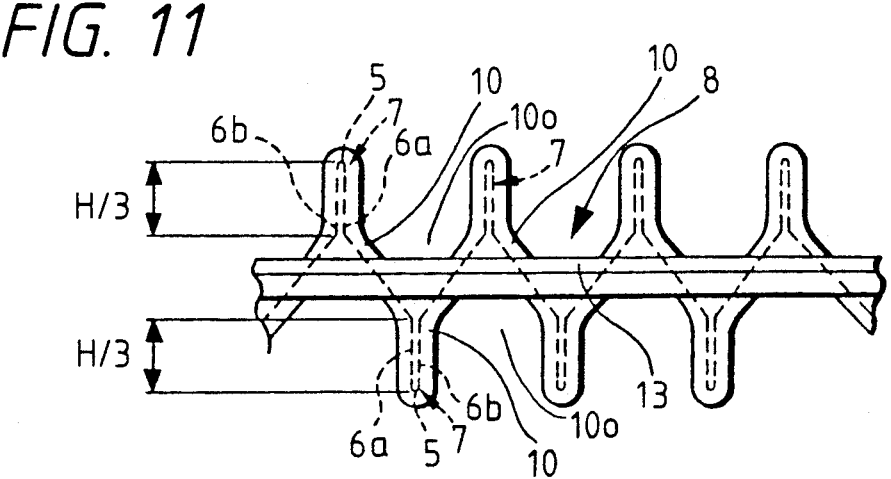
FIG. 11 is an enlarged fragmentary view as viewed in the direction of the arrow A in FIG. 8.

When molding the resin member, as shown in FIG. 11, fold members 6*a*, 6*b* of each mountain fold 6 of each of the filter paper units 4 are positioned by upper and lower mold members inwardly closely to each other at their opposite ends (indicated by X and Y in FIG. 9) over a prescribed length (e.g. H/3) from upper and lower fold ridges 5. Regions 7 where the fold members 6*a*, 6*b* are brought together are sealed or encased by the resin member 10, and openings 10*o* communicating with air passages 8 between the adjacent folds 6 are defined between the adjacent encased regions 7.

Figure 12:
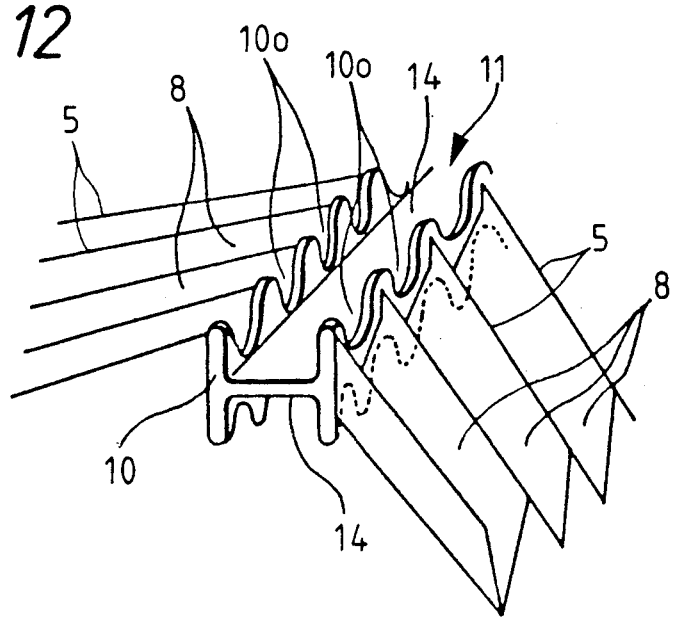
FIG. 12 is an enlarged view of an encircled portion B in FIG. 8.

As shown in FIG. 12, on each of the connectors 11 which interconnects the side edges of the adjacent filter paper units 4, groove-like air passages 14 are defined above and beneath the resin member 10 extending from the inner end to the outer end of the air cleaner element 3, so that the resin member 10 at the connector 11 has a cross-sectional shape of H. The groove-like air passages 14 communicate with the air passages 8 through the openings 10o.

Operation of the air cleaner element thus constructed will be described below.

Figure 8:
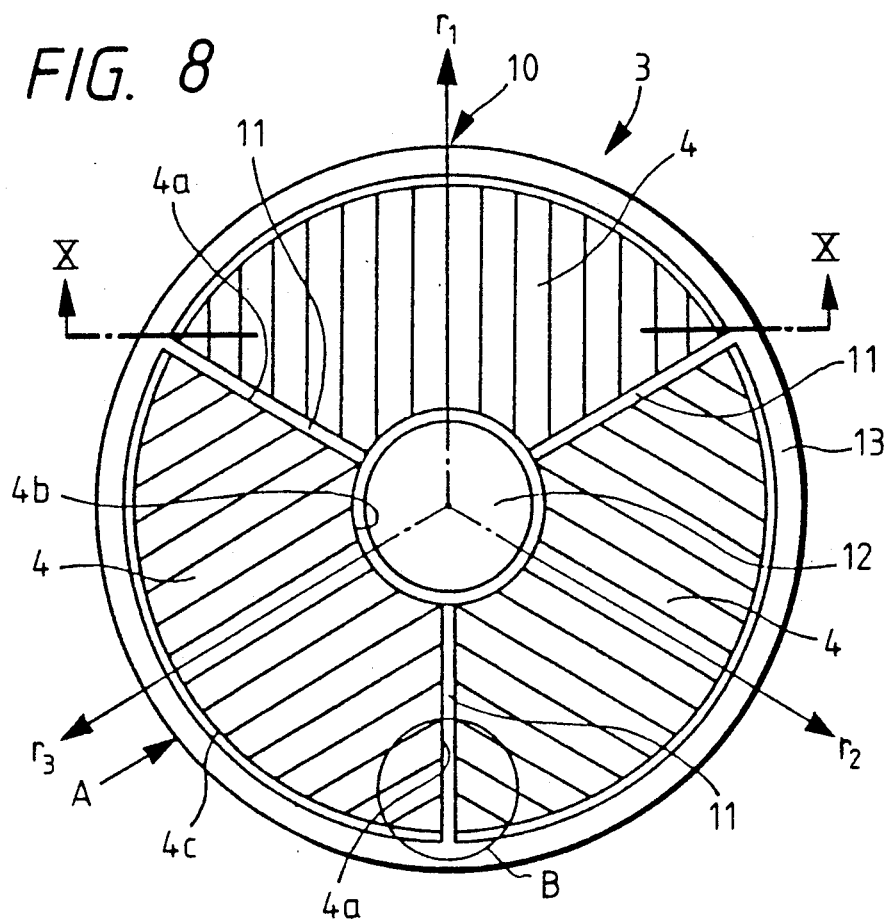
FIG. 8 is a plan view of an air cleaner element according to a third embodiment of the present invention.

As shown in FIGS. 1 and 8, air introduced from the air inlet 2i of the air cleaner 1 flows into an upper air cleaner chamber 1a above the air cleaner element 3. The cross-sectional area of the upper air cleaner chamber 1a is several times larger than the cross-sectional area of the air inlet 2i, so that the speed of the air flow upon entering the upper air cleaner chamber 1a from the air inlet 2i is greatly reduced. Then, the air flows from the upper air cleaner chamber 1a across the air cleaner element 3 into a lower air cleaner chamber 1b defined therebelow. At this time, the air is filtered by the air cleaner element 3, and only clean air from which dust has been removed is delivered from the air outlet 2o into a carburetor (not shown). When the air passes through the air cleaner element 3, it flows through the air passages 8 between the adjacent folds 6 at a uniform speed through the entire area of the air cleaner element 3. Since the folds of the air cleaner element 3 are spaced at equal pitches, the resistance to the air flow across the air cleaner element 3 is uniform.

The air which impinges upon the resin member 10 at the inner and outer ends of the filter paper units 4 is led from the openings 10o defined by the resin member 10 into the air passages 8 defined between the adjacent folds 6, and then passes through the air cleaner element 3. The air which impinges upoin the resin member 10 at the connectors 11 on the side edges 4a of the filter paper units 4 is led from the groove-like air passages 14 and the openings 10o defined by the resin member 10 into the air passages 8 defined between the adjacent folds 6, and then passes through the air cleaner element 3.

Figure 13:
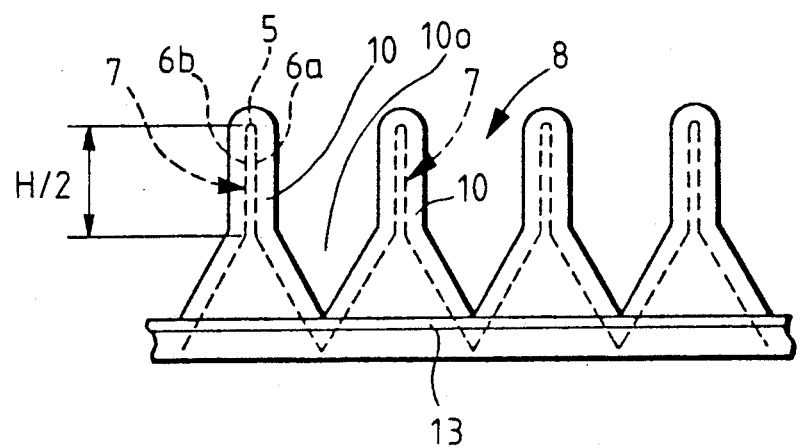
FIG. 13 is a view similar to FIG. 11, showing a modification of the third embodiment.
Figure 14:
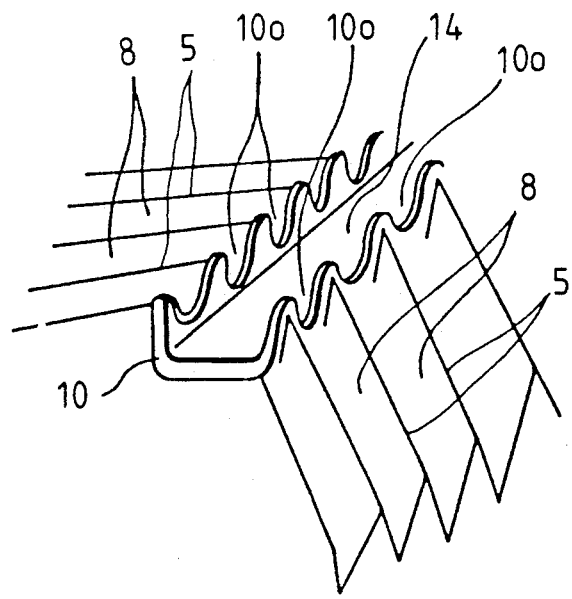
FIG. 14 is a view similar to FIG. 12, showing the modification of the third embodiment.

FIGS. 13 and 14 shown a modification of the air cleaner element 3 of the third embodiment. When molding the resin member, as shown in FIG. 13, fold members 6a, 6b of each mountain fold 6 of each of the filter paper units 4 are positioned by upper and lower mold members inwardly closely to each other at their opposite ends (indicated by X and Y in FIG. 9) over a prescribed length (e.g. H/2) from upper fold ridges 5. Regions 7 where the fold member 6a6b are brought together are sealed or encased by the resin member 10, and openings 10o communicating with air passages 8 between the adjacent folds 6 are defined between the adjacent encased regions 7.

As shown in FIG. 14, on each of the connectors 11 which interconnects the side edges of the adjacent filter paper units 4, a groove-like air passage 14 is defined above the resin member 10 extending from the inner end to the outer end of the air cleaner element 3, so that the resin member 10 at the connector 11 has a cross-sectional shape of U. The groove-like air passage 14 communicates with the air passages 8 through the openings 10o.

With the above embodiment, as described above, the fold members of each of the folds of each filter paper unit are brought closely to each other at opposite ends thereof over a prescribed length from the fold ridges, thereby defining openings of large air flow areas in the resin member which seals the outer edges of the filter paper units, the openings communicating with the air passages defined between the folds. Therefore, air can be led from the outer edges of the filter paper units through the openings into the air passages between the folds.

Moreover, the air which impinges upon the resin member on the side edges of the filter paper units is led into the air passages between the folds from the groove-like air passages defined in the resin member and connecting the inner and outer ends of the air cleaner element.

A method of manufacturing an air cleaner element according to the present invention will be described below.

Figure 15:
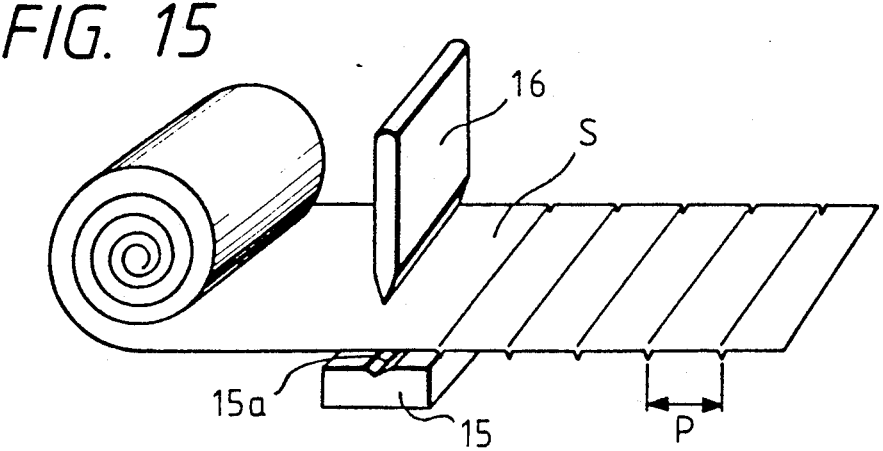
FIG. 15 is a perspective view showing a creasing step in a method of manufacturing an air cleaner element of the present invention.

In a first step of the method, as shown in FIG. 15, a sheet of filter paper S which is supplied from a sheet roll is creased at a constant pitch P so that the sheet can easily be folded at the creases. In this creasing step, the filter paper sheet S is creased by being pressed between a base 15 having a V-shaped groove 15a and a vertically moveable creasing blade 16.

Figure 16:
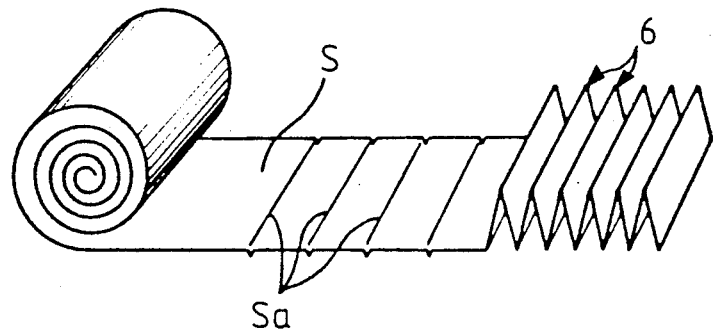
FIG. 16 is a perspective view showing a folding step of the method.

In a second step, as shown in FIG. 16, the filter paper sheet S is corrugated at the creases Sa to form a number of mountain folds 6 extending from one side to the other of the sheet S.

Figure 17:
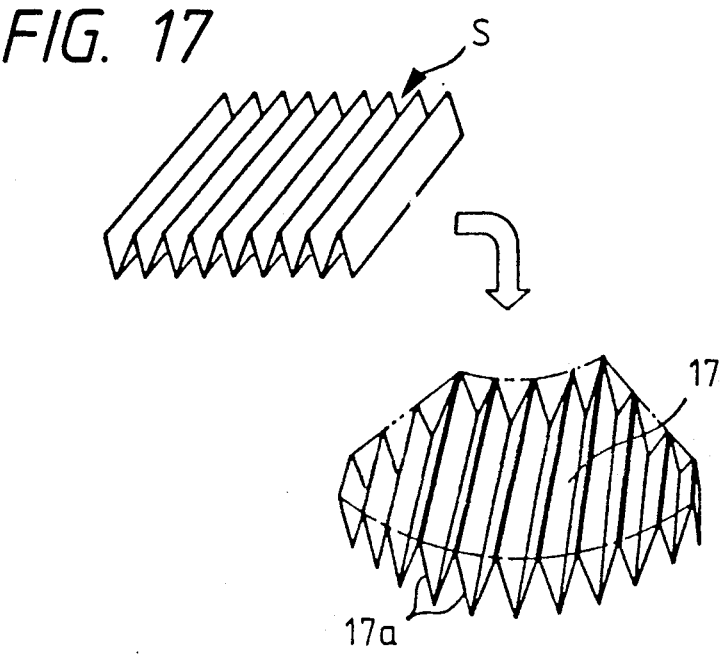
FIGS. 17 and 18 are perspective and cross-sectional views illustrating a blanking step in the method.
Figure 18:
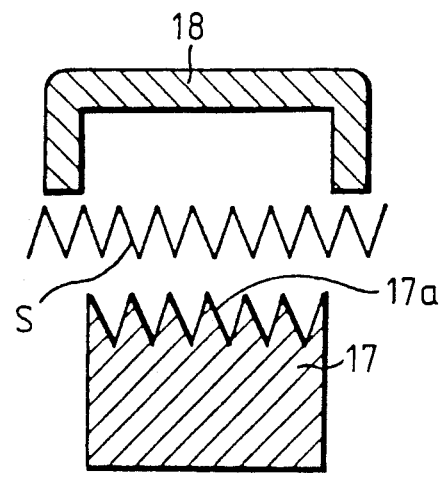

In a third step, the corrugated filter paper sheet S is blanked by cutting off the outer edge thereof to produce a filter paper unit 5 of a prescribed shape (sectorial shape in the embodiment). As shown in FIG. 17, more specifically, the corrugated filter paper sheet S is placed on a lower die 17 having on its outer periphery corrugated cutter edges 17a complementary to the folds of the filter paper sheet S. Then, as shown in FIG. 18, an upper die 18 is lowered toward the lower die 17 to cut off the outer edge of the filter paper sheet S.

Figure 19:
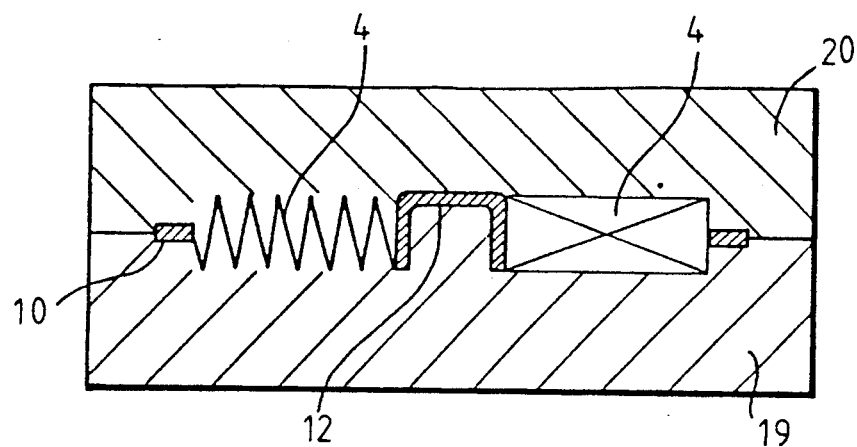
FIG. 19 is a cross-sectional view illustrating a forming step in the method.

In a fourth step, a plurality of filter paper units 4 each cut off to a desired shape are inserted between upepr and lower mold members 18, 20 as shown in FIG. 19, and then a resin material is poured into the mold composed of the combined upper and lower mold members 19, 20 to mold a resin member 10 having integral connectors 11 interconnecting side edges 4a of the filter paper units 4 and integral inner and outer frame members 12, 13, whereupon an air cleaner element 3 is produced. The upper and lower mold members 19, 20 have inner surfaces corrugated complementarily to the folded shapes of the filter paper units 4 so that the filter paper units 4 can easily be inserted and put in place between the upper and lower mold members 19, 20.

Figure 20:
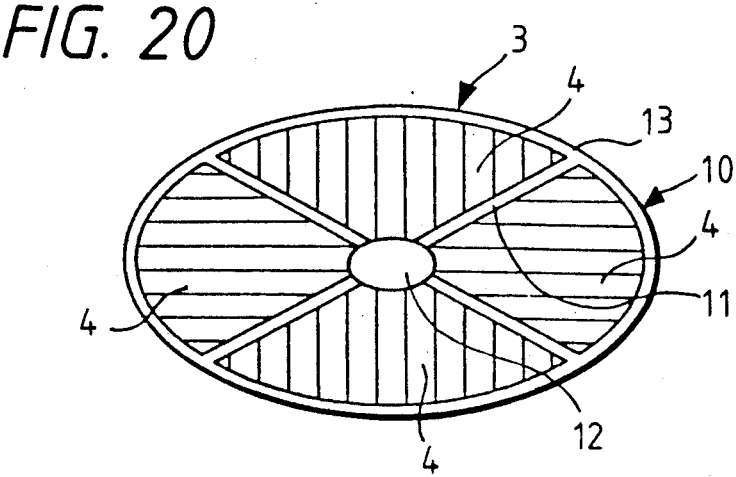
FIG. 20 is a plan view of an air cleaner element manufactured by the method of the present invention.

While a ciruclar air cleaner element is manufactured in the embodiment shown in FIGS. 15 through 19, an elliptical air cleaner element as shown in FIG. 20 or air cleaner elements of complex shapes can be manufactured by the method of the invention. When producing an air cleaner element in the illustrated embodiments, filter paper units are arranged such that the ridges of their folds run on or parallel to radial lines extending radially outwardly from the center of the air cleaner element to be formed. However, the filter paper units may be arranged in various other ways.

With the method of the present invention, as described above, a filter paper sheet is creased along stright lines spaced at a certain pitch, corrugated along the creases into a number of mountain folds, and then cut off into a filter paper unit of a prescribed shape. A plurality of such filter paper units are then inserted in a mold, and a resin material is poured into the mold to mold a resin member having integral connectors interconnecting side edges of the filter paper units and integral inner and outer frame members, thus producing an air cleaner element. According to the present invention, the step of forming straight creases on a fitler paper sheet at a prescribed pitch and the step of folding the filter paper sheet along the creases are highly simplified. Therefore, the cost of manufacturing an air cleaner element is reduced, and a process of manufacturing an air cleaner element can easily be automatized.

A plurality of filter paper units are interconnected by molding therearound a resin member which has integral connectors and inner and outer frame members. Consequently, it is not necessary to bond the filter paper units to each other, and as a result, the manufacturing process is simplified as no bonding step is necessary.

TEST EXAMPLE

The results of an experiment on an air cleaner element of the present invention and a conventional air cleaner element will be described with reference to FIGS. 21 and 22.

Air cleaner elements used has a filtration area of 2000 cm$^2$, and eight types of dust according to JIS Z8901 were employed. The test was performed according to JIS D1612.

Figure 21:
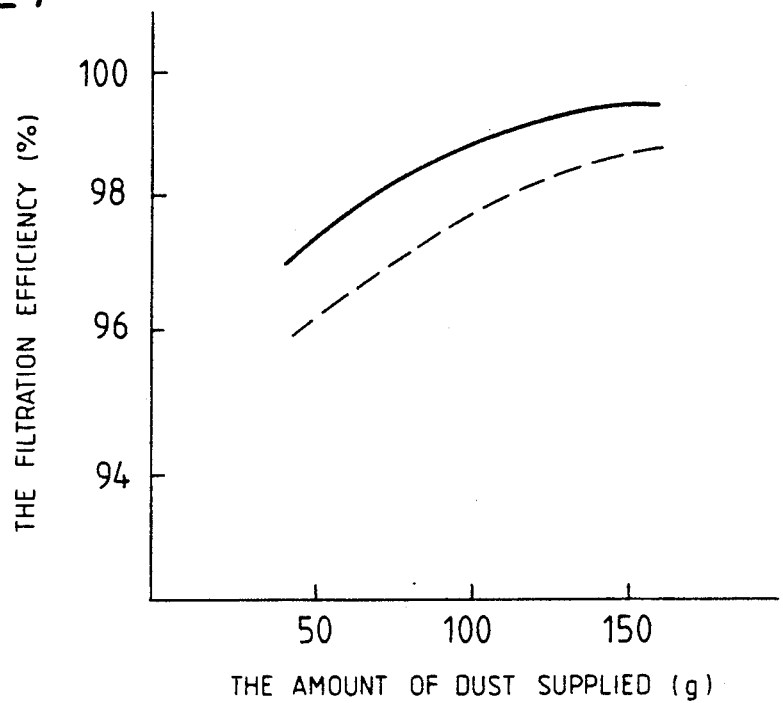
FIGS. 21 and 22 are graphs showing the results of a comparison test conducted on a conventional air cleaner element and an inventive air cleaner element for filtration performance.

FIG. 21 shows how the filtration efficiency (%) varied with respect to the amount of dust supplied (g). The horizontal axis of the graph respresents the amount of dust supplied (g), and the vertical axis the filtration efficiency (%). A broken-line curve indicates the filtration efficiency of the conventional air cleaner element, whereas a solid-line curve indicates the filtration efficiency of the air cleaner element according to the first embodiment of the present invention. FIG. 21 clearly indicates that the filtration efficiency of the inventive air cleaner element is about 1% higher than that of the conventional air cleaner element.

Figure 22:
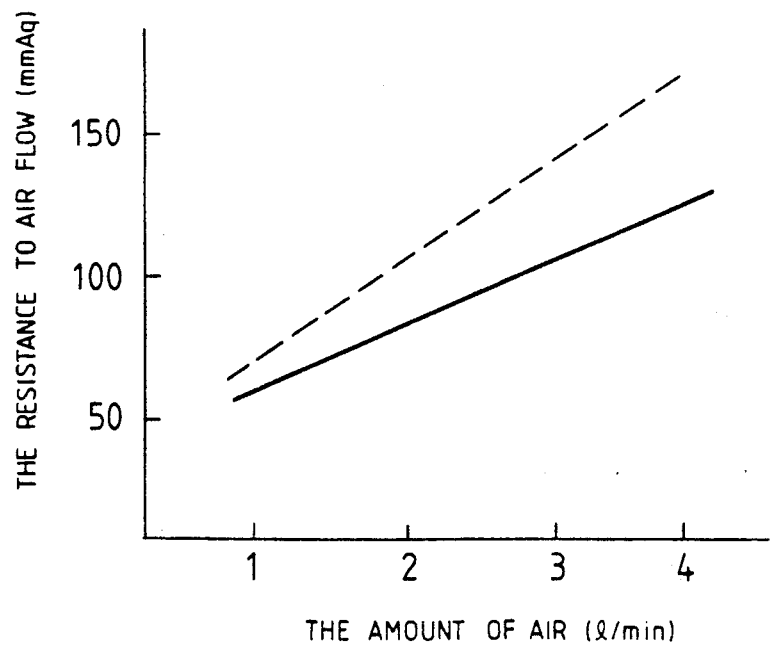
Figure 23:
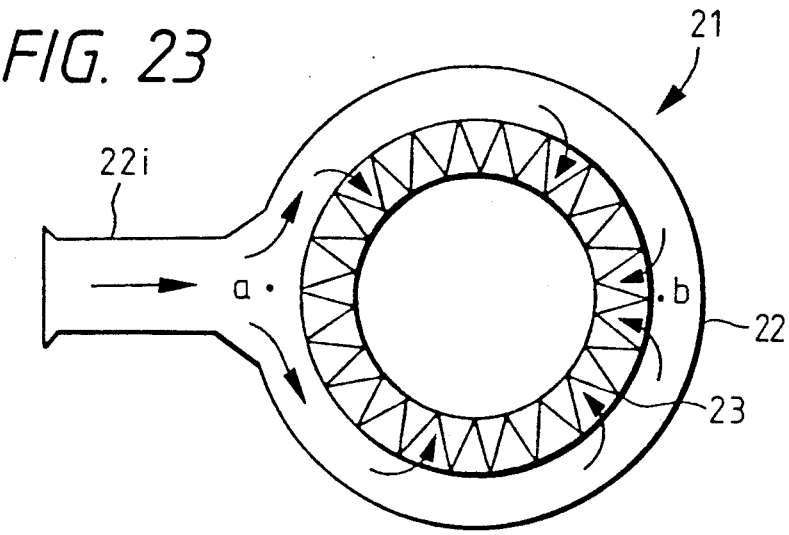
FIG. 23 is a horizontal cross-sectional view of an air cleaner incorporating a conventional air cleaner element.
Figure 24:
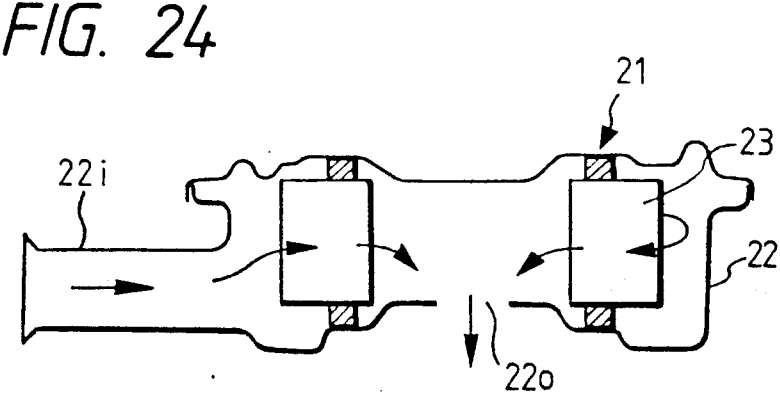
FIG. 24 is a vertical cross-sectional view of the air cleaner shown in FIG. 23.

FIG. 22 illustrates how the resistance to air flow (mmAq) varied with respect to the amount of air (1/min.) passed through the air cleaner elements. The horizontal axis of the graph represents the amount of air (1/min.) passed through the air cleaner elements, and the vertical axis the resistance to air flow (mmAq). A broken-line curve shows the resistance to air flow of the conventional air cleaner element, whereas a solid-line curve indicates the resistance to air flow of the air cleaner element according to the first embodiment of the present invention. It is apparent from FIG. 22 that the resistance to air flow of the inventive air cleaner element is about 10% lower than that of the conventional air cleaner element.

Although certain preferred embodiments have been shown and described, it should be understood that many changes and modifications may be made therein without departing from the scope of the appended claims.

What is claimed is:

1. An air cleaner element comprising:
    a) a connector unit including a central core, an outer frame member surrounding the core, and a plurality of spoke arms extending radially outwardly from the core to the frame member to define a plurality of like configured spaces, and
    b) a plurality of filter paper units individually disposed in said spaces, each unit comprising a sheet of filter paper corrugated into a plurality of folds extending from one side to the other of the sheet to define a plurality of parallel ridges, and each unit being arranged such that each ridge of each of the folds thereof lies on or extends parallel to a radial line extending outwardly from the central core and bisecting an associated space, said ridges being disposed in a zigzag manner as viewed in a direction perpendicular to an axial direction of the air cleaner element and parallel to said radial line;
    c) wherein each spoke arm abuts and interconnects confronting side edges of adjacent filter paper units.

2. An air cleaner element according to claim 1, wherein there are at least two of the filter paper units.

3. An air cleaner element according to claim 1, wherein said connector is molded of a resin material.

4. An air cleaner element according to claim 3, wherein each of said folds has fold members pinched closely together at distal-end portions thereof over a prescribed length from a ridge of the fold, said fold members pinched closely together being encased in a region by said connector unit made of resin material, thereby defining openings between adjacent ones of the regions, which communicates with air passages defined between adjacent ones of said folds.

5. An air cleaner element according to claim 1, wherein each spoke arm has a groove-like air passage of U-shaped cross section which communicates with air passages defined between adjacent ones of said folds via regularly spaced openings in side walls of said spoke arm.

* * * * *